United States Patent [19]

Birch

[11] 3,920,249

[45] Nov. 18, 1975

[54] PICKUP GUIDANCE MECHANISMS

[76] Inventor: Richard Wykeham Beaufoy Birch, Strelley Barn, Woodham, Mortimer, Maldon, Essex, England

[22] Filed: May 16, 1974

[21] Appl. No.: 470,529

Related U.S. Application Data

[62] Division of Ser. No. 236,911, March 22, 1972, Pat. No. 3,826,505.

[30] Foreign Application Priority Data

Mar. 25, 1971 United Kingdom................. 7821/71

[52] U.S. Cl................................................. 274/23 A

[51] Int. Cl.²............................................ G11B 3/38

[58] Field of Search......................... 274/23 R, 23 A

[56] References Cited

UNITED STATES PATENTS

| | | | |
|---|---|---|---|
| 3,059,934 | 10/1962 | Urmenyi | 274/23 A |
| 3,476,394 | 11/1969 | Birch | 274/23 R |
| 3,826,505 | 7/1974 | Birch | 274/23 A |

*Primary Examiner*—Richard E. Aegerter

*Assistant Examiner*—Steven L. Stephan

*Attorney, Agent, or Firm*—Browdy and Neimark

[57] ABSTRACT

A pickup guidance mechanism for gramophone disc records comprises a straight arm on which the pickup is carried and which is pivoted for rotation in a plane parallel to the record, a slave arm also pivoted for rotation in a plane parallel to the record and which carries the pivot of the straight arm, a radiation shutter mounted on the straight arm and formed with an edge located in a plane parallel with the record and a sensing element which co-operates with said edge, the shape of the edge ensuring predetermined relative movement between the edge and the sensing element during traverse by the pickup with zero tracking error, whereby, upon departure of the straight arm from zero tracking error, the sensing element is adapted to produce a command signal, and correcting means responsive to said command signal and adapted to effect movement of the straight arm towards the position thereof corresponding with zero tracking error.

7 Claims, 6 Drawing Figures

PICKUP GUIDANCE MECHANISMS

This is a divisional application of Ser. No. 236,911 filed Mar. 22, 1972, now U.S. Pat. No. 3,826,505.

This invention relates to pick-up guidance mechanisms.

In a stereophonic gramophone pick-up, the stylus can make small movements in two directions at right angles, and these movements can be deemed to occur in a certain plane, herein called the "excursion plane," which lies, commonly, at an angle of about 75° to the plane of the record. The intersection of the excursion plane and the record plane is herein called the "excursion line." Pick-ups are, commonly, symmetrical in construction about a plane at right angles to the excursion plane and the record plane. This plane is herein called the "symmetry plane," and its intersection with the record plane is herein called the "symmetry line."

For best audio reproduction, the pick-up requires to be guided so that the excursion line passes through the record rotation axis. Commonly, however, this situation is not achieved. The angle at any time between the excursion line and the record radius passing through the stylus is called the tracking error angle.

In the case of conventional pick-up arms, the arm is mounted, for rotation in a plane parallel to the record, on a pivot which is fixed relative to the baseboard of the apparatus, the pivot is made as nearly free from friction as possible, and the arm is shaped for minimizing tracking error, in consequence of which, the symmetry plane passes at a considerable distance from the pivot axis. For example, this distance is about 9 cm. in the case of a conventional arm with a length of 20 cm. from stylus to pivot. Thus, the frictional drag force between stylus and record, being directed tangentially to the record groove, has a considerable turning moment about the pivot. This turning moment is resisted by a force at the stylus and, if tracking error is zero at the time, this force is directed along the excursion line. If tracking error is small but not zero, the force acts at only a small inclination to the excursion line.

A force in the plane of the record, acting at the stylus along the excursion line, is called side-pressure, and the particular form of side-pressure resulting as described from the shaping of conventional arms for minimum tracking error is herein called "geometric" side-pressure. Any side-pressure is harmful to audio reproduction, because the mean position about which the stylus vibrates in response to groove modulation is, contrary to the intended mode of operation, displaced from the rest-position of the stylus.

If the arm is shaped so that the symmetry plane contains the pivot axis, the tangential drag force can cause no side-pressure, since, if the pivot is frictionless, the equilibrating force can act only in the direction from stylus to pivot. An arm so shaped is herein called a "straight" arm. It is clear therefore, that with a straight arm and a frictionless pivot, geometric side-pressure is zero whether tracking error is zero or not.

The objects of the invention are, first, the complete or nearly complete elimination of geometric side-pressure and, second, the simultaneous reduction of tracking error. The first aim is achieved by the use of a straight arm, and the second object is assisted by powered means, described later, for moving the arm pivot relative to the baseboard of the apparatus.

In the present invention as well as the elimination or near elimination of side-pressure, tracking error is ideally to be eliminated completely.

The present invention consists in a pick-up guidance mechanism for gramophone disc records comprising: a pickup which can receive a stylus for engaging a groove on a record: a straight arm on which the pick-up is carried for guidance across the record without geometric side pressure acting on the stylus and pivoted about an axis for rotation in a plane parallel to the record; and a slave arm pivoted for rotation in a plane parallel to the record about an axis which is fixed and which carries the pivot of said straight arm; characterised by straight arm position sensing means having a first element formed with an edge located in a plane parallel with the record and a second or sensing element which co-operates with said edge of the first element, one of said elements being fixed relatively to the straight arm and the other fixed relatively to the record rotation axis, the shape of the edge of the first element ensuring predetermined relative movement between said elements during traverse by the pick-up of a record groove in which tracking error is maintained at zero, whereby, during traverse of a record groove by the pick-up, upon departure of the straight arm from the position thereof corresponding with zero tracking error, the second or sensing element is adapted to produce a command signal, and correcting means responsive to said command signal and adapted to effect movement of the straight arm towards the position thereof corresponding with zero tracking error.

Suitably the first element is a laminar cam mounted on the straight arm and having a curved profile which co-operates with the second or sensing element, the latter comprising a light source and photocell located on respective opposite sides of and on an axis transverse to the laminar cam.

By maintaining the co-operation between the second element and the edge of the first element, the angle subtended at the straight arm rotation axis by the stylus and the slave arm rotation axis is held at three right angles less the sum of the angle subtended at said slave arm rotation axis by the rotation axes of respectively the record and said slave arm, and the angle subtended at the record rotation axis by the stylus and said slave arm rotation axis. This relationship arises because the three angles specified are contained within a quadrilateral, the fourth angle of which is that subtended at the stylus by the record and straight arm rotation axes and requires to be a right angle for zero tracking error.

The invention will now be described, by way of example, with reference to the accompanying drawings, in which.

In a known mechanism, the angle subtended at the pick-up arm rotation axis by the stylus and the slave arm rotation axis is, ideally, kept constant by action of electrical contacts in circuit with an electric motor that rotates the slave arm. Assuming for the moment that this angle is kept truly constant, the two arms combine in a configuration equivalent to a conventional arm. For example, (see FIG. 1), a pick-up arm SP with stylus at S and pivot at P, together with a slave arm PC pivoted at C and carrying the pivot P of arm SP, the angles CPS and CSP being constant angles $\theta$ and $\phi$, give the configuration of a conventional arm SC (see FIG. 2), with stylus at S, pivot at C, offset angle $\phi$, and a length L from S to C equal to the length L of FIG. 1. Hence, whatever limitation of tracking error is obtainable from the conventional arm SC is equally obtainable from the combination of arms SP and PC.

Figure 1:
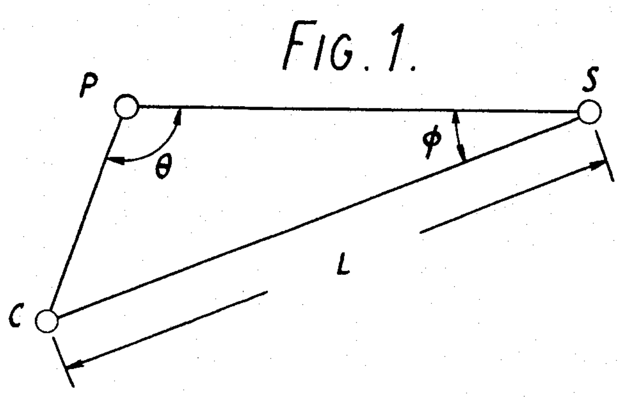
FIG. 1 is a drawing illustrating the basic geometry of the present invention.
Figure 2:
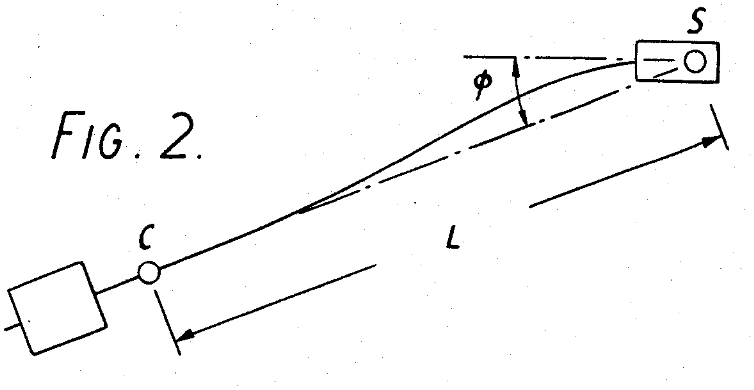
FIG. 2 is a diagrammatic plan view of a conventional pick-up arm with offset angle $\phi$.
Figure 3:
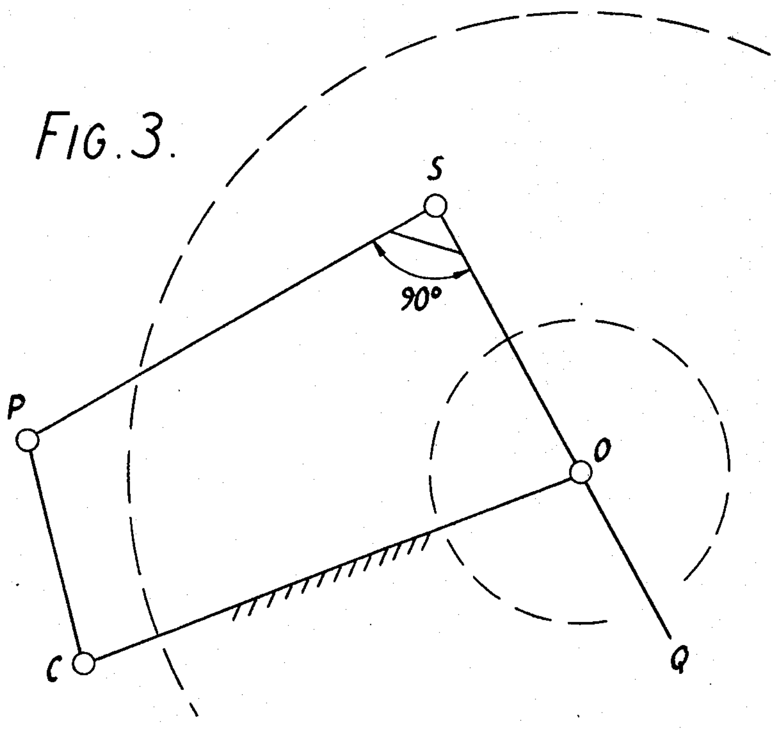
FIG. 3 is a diagram illustrating some of the geometry of the present invention.

With reference to FIG. 3, it can be seen that during a playing of a record centered at O with zero tracking error, the arms CP and PS of FIG. 1 are kinematically equivalent to a fixed member CO, a bar CP hinged at C and a bar PSQ hinged at P and having the angle PS a right angle, while portion SQ is constrained to pass through O. Thus, for any one value of the distance SO during a playing, there is one and only one value of angle CPS, and the sum of angles SOC, OCP and CPS is three right angles.

The preferred embodiment of the present invention includes alignment means, having in broad terms the nature of a cam, whereby the desired size of angle CPS for any particular value of distance SO can be bodily manifested, and sensing means for comparing, throughout a playing, the actual with the manifested desired value of angle CPS. Here can be seen the basis of automatic correction whereby maintenance of angle CPS at always its desired size ensures the traverse of a record with zero tracking error. Thus the complete or nearly complete elimination of geometric side-pressure is combined with the complete or nearly complete elimination of tracking error.

Figure 4A:
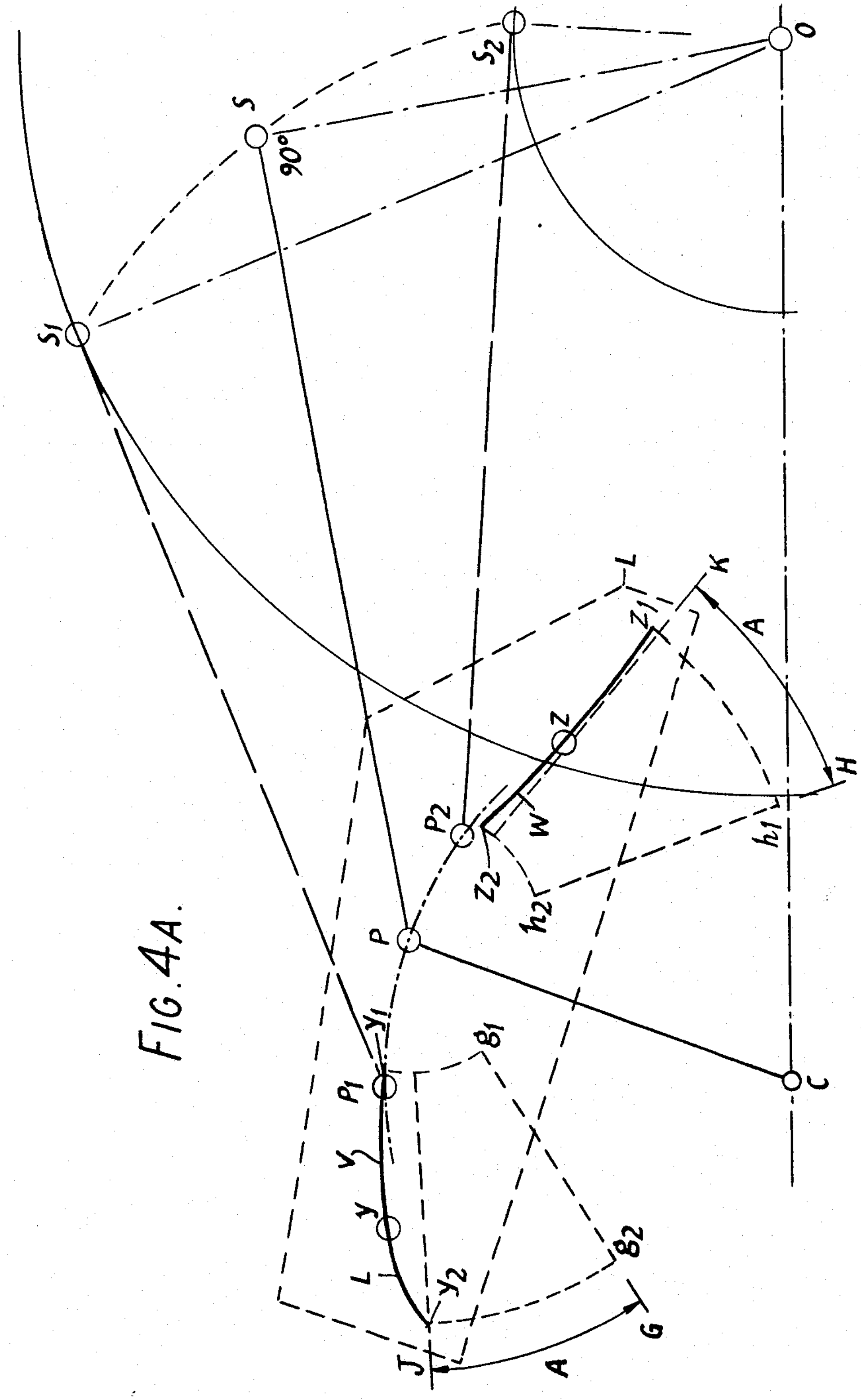
FIG. 4A is a diagram illustrating the geometry of the present invention.

FIG. 4A shows the geometry of the invention in diagrammatic form. Pick-up arm SP, with stylus at S and pivot at P, is carried on slave arm CP pivoted at axis C. Rigidly attached to arm SP is lamina L. In the plane of the lamina, and fixed relative to the baseboard, are two points Y, Z, chosen to suit certain requirements described later. As the stylus S traverses a record, centered at O, with zero tracking error, the respective loci of points Y, Z, relative to the lamina are continuous curves which, for given lengths SP, PC and CO, are also unique. In the Figure, curves V, W, illustrate these loci. $S_1$, $P_1$ and $S_2$, $P_2$ represent the positions of S and P at the beginning and end of a record, and $Y_1$, $Z_1$ and $Y_2$, $Z_2$ the then positions of Y and Z on the lamina.

If now in an embodiment a lamina has two operative portions, $V_1$, $W_1$, of its edge shaped to the curves V, W, and lying relative to points Y, Z, as do the curves V, W, of FIG. 4A, and if at each of points Y, Z, a lamp and a photocell are mounted on a line at right angles to the lamina and lying one above the lamina and the other below, then there can be seen the basis of an optical control system in which the condition of zero tracking error corresponds to a null or balance condition in the control system.

The sensing of error at points Y and Z can be done in various ways: for example, the laminar cam member can be an opaque plate with its edge shaped to the desired curves V and W, and the plate can be shaped so that the area between curves V and W in the clockwise direction around P is occupied by the plate while the area between W and V is not, or vice versa: or the cam member can surround both curves and can be partly opaque and partly transparent, in which case, photographic printing from a master copy on to photosensitive sheet material can be suitable method of manufacturing the cam profiles.

As regards sensitivity in the sensing means, it is clear that when arm PS departs by a given amount from a position of zero tracking error, the slave arm being momentarily stationary, the area swept by the length of cam edge opposite each photocell requires to be large. For this purpose, points Y and Z need to be chosen so that P does not approach very close to either of them, and so that the curves V and W are not very different from straight lines passing through P. By way of example to be avoided, it is clear that there is momentarily no sensing if P is allowed to coincide with Y or Z or if at any time the operative portion of curve V or W is a portion of a circle centered at P. In the Figure, Y and Z are chosen so that P does not approach nearer than the arbitrary distance 25 mm. to either of them and so that curves V and W are reasonable approximations to straight lines through P.

Figure 4B:
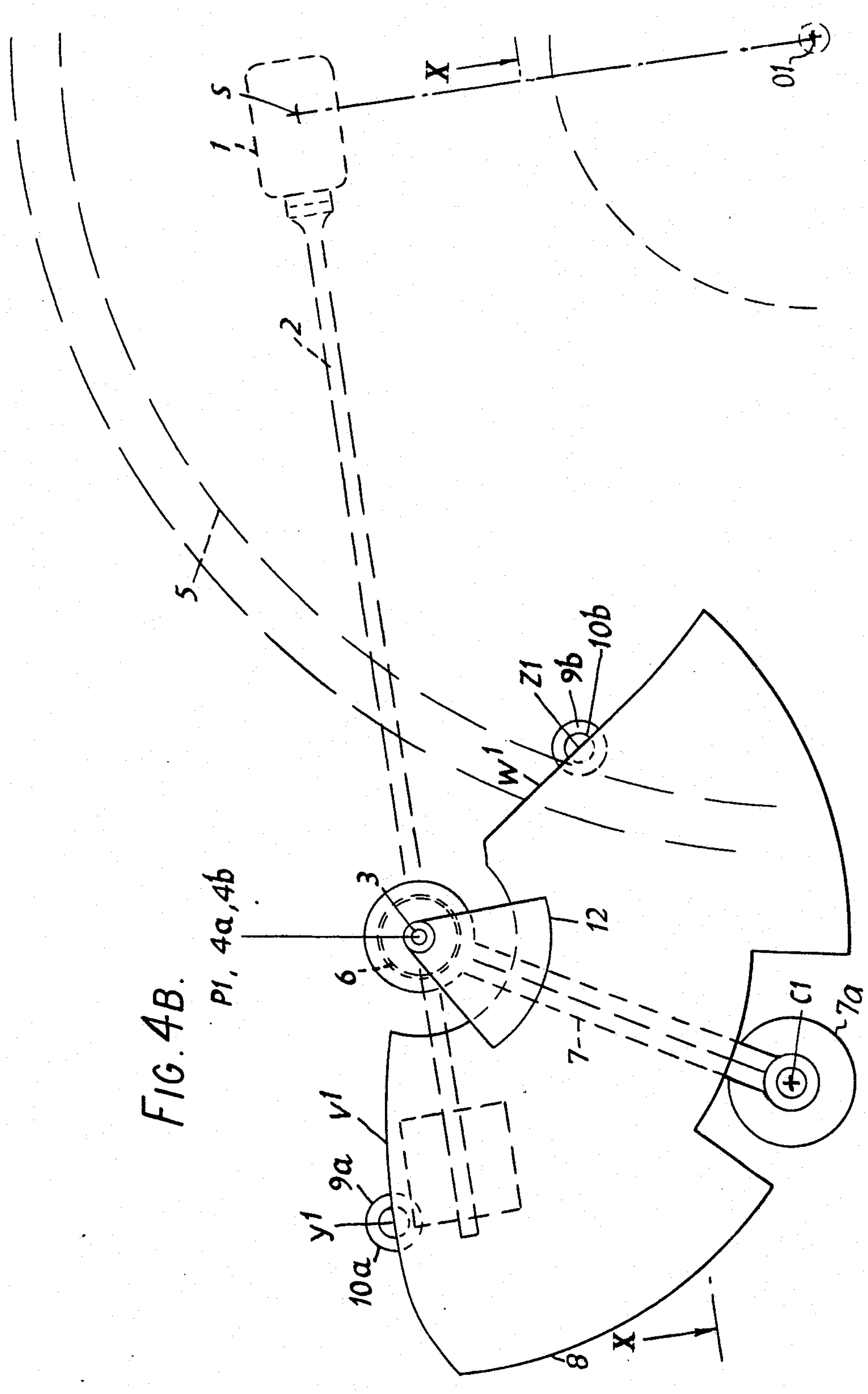
FIG. 4B is a plan view of parts of an embodiment of the invention located below the baseboard of the apparatus.
Figure 4C:
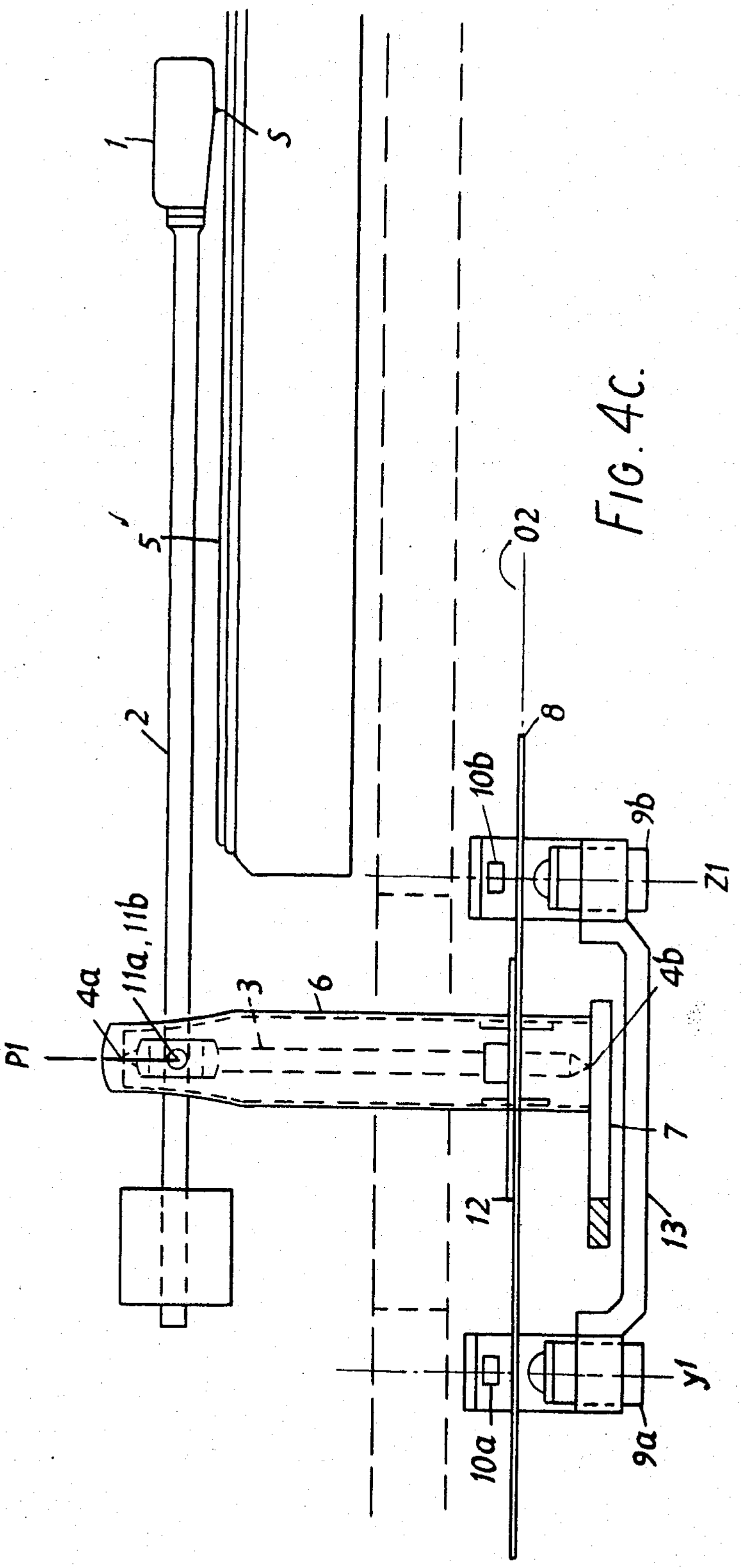
FIG. 4C is a sectional view taken on the line X—X of FIG. 4B.

The geometry of FIG. 4A is shown applied to an embodiment in FIGS. 4B and 4C. Here, pick-up 1 with stylus S is carried on pick-up arm 2 which carries spaced pivots 11*a*, 11*b*, permitting rotation at right angles to record 5. Stylus S engages the groove on record 5 centered at axis 01. Pivots 11*a*, 11*b*, bear in gymbal fashion in stem 3 which terminates in pivots 4*a*, 4*b*, permitting rotation about axis P1. Rigidly attached to stem 3 through bracket 12 is cam member 8 disposed for rotation in plane 02 parallel to the record. Pillar 6 carries pivots 4*a*, 4*b*, and is rigidly attached to slave arm 7 which is pivoted for rotation about axis C1, which is fixed relative to a baseboard. The axes C1 and P1 are at right angles to the record plane.

Y1 and Z1 represent further axes at right angles to the record plane and correspond to points Y and Z of FIG. 4A. On each of these axes are disposed sensing means in the form of a lamp, 9*a*, 9*b*, and a photocell, 10*a*, 10*b*, mounted in a fixed chassis 13 and placed on respective opposite sides of the plane 02 with cam member 8 in the path of light therebetween.

Cam member 8 has portions, $V^1$, $W^1$, of its edge shaped to certain curves and disposed so that said portions traverse the respective light paths while the pick-up traverses a record. With this arrangement it is clear that provided that axes Y1, Z1, and curves $V^1$, $W^1$, are related to one another as are the points Y, Z, and curves V, W, of FIG. 4A, then, if, by operation of the sensing means and servo circuitry and correcting means which are described later, the edges of cam member 8 are maintained intersecting axes Y1, Z1, the pick-up will traverse the record with zero tracking error. If while the slave arm is momentarily at rest the stylus travels across the record, the balanced condition is upset and, in response to unequal illumination of the cells, an electrical signal is passed to the servo circuitry and through correcting means in the form of a rotary reversible electric motor 7a, rotation of the slave arm is caused in a direction tending to restore the balanced condition in which tracking error is zero. This is an example of correction of leading tracking error, corresponding to increased illumination of cell 10*b* and decreased illumination of cell 10*a*. The converse error, or lagging error, can occur with a swinger record, that is to say, a record in which the geometrical center of the groove spiral is displaced from the record rotation axis, or when the pick-up arm is manually returned to its part position after a playing.

The servo circuitry, briefly described, is supplied with external power and operates as a control system of known closed-loop type: and includes elements for proportional response to input signal and for power amplification: and produces, for driving a rotary reversible electric motor, an output whereby the direction, amount, and speed of rotation of said motor are made suitable for the correction of error taking into account the speed at which tracking error would, in the absence of control, accumulate in the playing of ordinary records including swingers: and can if desired include elements for response to rate of change of input signal and elements for phase change.

The servo motor *7a*, driven by said circuitry output, rotates the slave arm through ordinary reduction gearing and an ordinary slipping device which permits manual rotation of the slave arm without harm to the motor or gearing. The drive between motor and gearing may if desired by biassed, for example by spring means or gravity means, to overcome mechanical backlash.

At a certain angle of departure of the straight arm from the described mean position, this certain angle being herein called the critical angle, one photocell is just fully illuminated and the other photocell is just fully shadowed. This condition corresponds to maximum electrical command to the servo circuitry. It is clear that the use of opaque material for a cam as shown in FIG. 4B ensures maximum command at departure angles exceeding the critical angle by a large amount: consequently, gross departures of the straight arm from the described mean position, such as can occur when the pickup, free from the record, is moved quickly by hand, cause maximum command and can be corrected at the maximum pursuit speed of which the correcting means are capable. Further, the size of the critical angle may be varied by varying the apertures of the photocells: in particular, the critical angle may be chosen to be slightly less than the departure angle likely to occur in the playing of modulated portions of the groove on an ordinary record. In this case, the greatest departure angle occuring in the whole traverse of a record groove can be the angle that occurs when the stylus enters the unmodulated portion of groove at suddenly increased pitch leading to the customary closed finishing groove. Occurrence of this greatest angle may be used to actuate not the correcting means but an automatic operation, such as is customary in autochanger machines, of raising the pickup from the record.

The sensing takes place below the record plane and the sensing means can, therefore, be accommodated in the height required for the turntable motor without adding to the height required above the turntable and are screened from ambient light by being enclosed in the customary box holding the apparatus. Also, each photocell can be mounted at a very small distance from its co-operating lamp, and the angle of incidence of light on the photocells is constant. Furthermore, electrical conductors serving the lamps and photocells can be attached throughout to the fixed parts of the apparatus and do not interfere with freedom of movement of the straight arm. These features assist accurate sensing in combination with easy manufacture.

The departure angle, measured in either sense from the described mean position of the straight arm, over which the difference in illumination of the photocells yields a significant command signal is herein called the capture angle. FIG. 4A shows that if a certain angle A is the desired capture angle, then the angle YPZ measured internally must never be less than 2A. Thus if lines PJ, PK, are drawn such that the whole of the operative curves V, W, lie outside the sector JPK, and if lines PG, PH, are drawn such that angles JPG, KPH, are each A, then a cam member which extends over the areas bounded, respectively, by curve V from $Y_1$ to $Y_2$, circular arcs $Y_1g_1$, $Y_2g_2$, centered at P, and segment $g_1g_2$ of line PG, and by curve W from $Z_1$ to $Z_2$, circular arcs $Z_1h_1$, $Z_2h_2$, centered at P, and segment $h_1h_2$ of line PH, will suffice to ensure the desired capture angle.

In FIG. 4A, angle A is shown as 30°, and the least value of angle YPZ during a traverse is, for other reasons, much greater than 2A. In FIG. 4B, the cam member 8 is shown extending, for mechanical convenience, over a much greater area than is required for a capture angle of 30°.

The described embodiment employs visible light in its sensing means, but as regards generality of the invention it is not to be inferred that visible light is the only applicable radiation. Other radiations, for example electromagnetic radiation of frequencies outside the range of visible light, or molecular vibration in the air, can be employed. Infra-red radiation or ultrasonic vibration may be utilized: techniques for employing either of these for transmission of information are well established.

The sensing means, instead of employing radiation, may be more direct in nature: for example, movement of the lamina may actuate direct electrical switching by the opening and closing of contacts of which one may be fixed at a sensing axis and another may be the laminar cam itself. In such cases, pressure between the closed contacts will cause some side-pressure at the stylus, but the side-pressure can be kept small by choosing a contactor member, or contactor members, of a light springy nature.

With sensing means employing radiation as described, occurrence of tracking error causes a servo circuitry input of essentially a modulated nature, while with sensing means employing switching, said input is essentially of a two-state or on-off nature. It is to be noted however that by including in the servo circuitry elements for time-integration of input signal, the electrical supply to the servo motor can be of a modulated nature and therefore, even without considering mechanical inertia of moving parts, switching at the input need not cause jerkiness of the mechanical correction of error.

For the minimizing of side-pressure other than geometric side-pressure, it is desirable that friction and constraint at the pivot of the pick up arm should be the least possible: but this feature is not necessary at the slave arm pivot since this arm is powered. Hence, by care in the design at the pivot of the pick-up arm such as would be applied to the design at the pivot of a conventional arm, the same success in the minimizing of side-pressure other than geometric side-pressure can be achieved as with a conventional arm: and the resultant side-pressure from all causes is greatly reduced in a guidance mechanism according to the invention, compared with that in a conventional arm.

I claim:

1. A pickup guidance mechanism for gramophone disc records, comprising a pickup which can receive a stylus for engaging a groove on a record; a straight arm on which the pickup is carried for guidance across the record without geometric side pressure acting on the stylus and pivoted about an axis for rotation in a plane parallel to the record; a slave arm pivoted for rotation in a plane parallel to the record about an axis which is fixed, said slave arm carrying the pivot of said straight arm; straight arm position sensing means having a first element formed with an edge located in a plane parallel with the record and a sensing element adapted to produce a command signal and which co-operates with said edge of the first element wherein, one of said elements is fixed relatively to the straight arm and the other fixed relatively to the record rotation axis and, throughout a traverse by the pickup of a record groove, the sensing element co-operates with the edge of the first element on the side of the slave arm on which the record center is located, the shape of the edge of the first element being such that during traverse by the pickup of a record groove the second or sensing element produces the command signal upon departure of the straight arm from the position thereof corresponding with zero tracking error; and correcting means responsive to said command signal and adapted to effect movement of the slave arm and hence of the pivot of the straight arm, thereby to move the straight arm towards the position thereof corresponding with zero tracking error.

2. A mechanism as claimed in claim 1, wherein the first element serves as a radiation shutter and the second or sensing element includes a source of radiation, for example a light source, the first element being disposed in a plane parallel to the record for co-operation with radiation from the source directed transversely with respect to the plane.

3. A mechanism as claimed in claim 2, wherein the first element is pivoted for rotation in the said plane about the rotation axis of the straight arm and is linked for common rotation with the straight arm, a portion of the first element being formed with an edge having a shape such that over the operative range of rotation of the element, corresponding with the operative range of rotation of the straight arm, said edge intersects, throughout a traverse of the pick-up across a record with zero tracking error, a sensing line passing through a chosen fixed point in the record plane and lying at right angles to that plane.

4. A mechanism as claimed in claim 3, wherein a further sensing element is provided and there is chosen a further fixed point in the record plane for a further sensing line of said further element lying at right angles to the record plane, and wherein the first element includes two edge portions which intersect, throughout a traverse of the pickup across a record with zero tracking error, the respective sensing lines.

5. A mechanism as claimed in claim 4, wherein the second or sensing element comprises, co-axial with each sensing line and disposed on respective opposite sides of the first element, a light source and photoelectric cell.

6. A mechanism as claimed in claim 5, wherein the first element is formed with a curved edge which co-operates with said second element.

7. A mechanism as claimed in claim 2 wherein said source of radiation is a light source.

* * * * *